US008270524B2

(12) United States Patent
De Lind Van Wijngaarden

(10) Patent No.: US 8,270,524 B2
(45) Date of Patent: Sep. 18, 2012

(54) METHOD AND APPARATUS FOR INTERFERENCE POST-COMPENSATION USING A BANDWIDTH-ADAPTIVE POSTCODER INTERFACE

(75) Inventor: Adriaan J. De Lind Van Wijngaarden, New Providence, NJ (US)

(73) Assignee: Alcatel Lucent, Paris (FR)

( * ) Notice: Subject to any disclaimer, the term of this patent is extended or adjusted under 35 U.S.C. 154(b) by 348 days.

(21) Appl. No.: 12/640,997

(22) Filed: Dec. 17, 2009

(65) Prior Publication Data

US 2010/0329399 A1 Dec. 30, 2010

(51) Int. Cl.
*H04B 15/00* (2006.01)
(52) U.S. Cl. ........ 375/285; 375/296; 375/346; 375/229; 375/231; 375/232; 379/416; 379/417
(58) Field of Classification Search .................. 375/296, 375/285, 346, 229, 231, 232; 379/416, 417
See application file for complete search history.

(56) References Cited

U.S. PATENT DOCUMENTS

| | | | |
|---|---|---|---|
| 6,693,992 B2 | 2/2004 | Jones et al. | |
| 6,829,293 B2 | 12/2004 | Jones et al. | |
| 6,985,521 B1 | 1/2006 | Rezvani et al. | |
| 7,218,681 B2 * | 5/2007 | Huang | 375/296 |
| 2009/0116582 A1 | 5/2009 | Ashikhmin et al. | |
| 2009/0180405 A1 | 7/2009 | Ashikhmin et al. | |
| 2009/0245081 A1 | 10/2009 | Ashikhmin et al. | |

OTHER PUBLICATIONS

X. Hou et al., "A Time-Domain Approach for Channel Estimation in MIMO-OFDM-Based Wireless Networks," Institute of Electronics, Information and Communication Engineers, Transactions on Communications, Jan. 2005, pp. 3-9, vol. E88-B, No. 1.
ITU Recommendation, COM 15-C 685-E, "G.vector: Advantages of Using a Startup Sequence for Joining Event," Study Group 15—Contribution 685, Infineon Technologies North American, pp. 1-3, Jan. 2008.
ITU Recommendation, COM 15-C 177-E, "G.vds12: Pilot Sequence Assisted Vector Channel Estimation," Study Group 15—Contribution 177, Upzide Labs, pp. 1-6, Oct. 2006.
ITU-T Recommendation G.993.2, "Very High Speed Digital Subscriber Line Transceivers 2," Series G: Transmission Systems and Media, Digital Systems and Networks, Feb. 2006, 252 pages.
U.S. Appl. No. 12/570,093, filed Sep. 30, 2009 and entitled "Crosstalk Control Using Delayed Post-Compensation in a Multi-Channel Communication System."
U.S. Appl. No. 12/493,328, filed Jun. 29, 2009 and entitled "Crosstalk Estimation and Power Setting Based on Interpolation in a Multi-Channel Communication System."
U.S. Appl. No. 12/370,148 filed in the name of G. Kramer et al. on Feb. 12, 2009 and entitled "Simultaneous Estimation of Multiple Channel Coefficients Using a Common Probing Sequence." U.S. Appl. No. 12/352,896, filed in the name of A. Ashikhmin et al. on Jan. 13, 2009 and entitled "Power Control Using Denoised Crosstalk Estimates in a Multi-Channel Communication System."

* cited by examiner

*Primary Examiner* — Phuong Phu
(74) *Attorney, Agent, or Firm* — Ryan, Mason & Lewis, LLP

(57) ABSTRACT

In a communication system, a postcoder is coupled between first and second portions of each of a plurality of receivers. The postcoder is configured to receive an adaptive index representation of a scaled signal associated with the first portion of a first one of the receivers, and to process the adaptive index representation using an adjusted postcoder coefficient to generate a postcompensation signal. The postcompensation signal is supplied by the postcoder to the second portion of a second one of the receivers for use in post-compensation of at least one signal received by the second receiver.

21 Claims, 9 Drawing Sheets

METHOD AND APPARATUS FOR INTERFERENCE POST-COMPENSATION USING A BANDWIDTH-ADAPTIVE POSTCODER INTERFACE

RELATED APPLICATIONS

The present invention is related to the invention disclosed in U.S. patent application Ser. No. 12/640,975, filed concurrently herewith and entitled "Crosstalk Control Method and Apparatus Using a Bandwidth-Adaptive Precoder Interface," which is commonly assigned herewith and incorporated by reference herein.

The present invention is also related to the invention disclosed in European Patent Application No. 09290482.0, filed Jun. 24, 2009 and entitled "Joint Signal Processing Across a Plurality of Line Termination Cards," which is commonly assigned herewith and incorporated by reference herein.

FIELD OF THE INVENTION

The present invention relates generally to communication systems, and more particularly to techniques for mitigating, suppressing or otherwise controlling interference between communication channels in such systems.

BACKGROUND OF THE INVENTION

Multi-channel communication systems are often susceptible to interference between the various channels, also referred to as crosstalk or inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, signals transmitted over one subscriber line may be coupled into other subscriber lines, leading to interference that can degrade the throughput performance of the system. More generally, a given "victim" channel may experience crosstalk from multiple "disturber" channels, again leading to undesirable interference.

Different techniques have been developed to mitigate crosstalk and to maximize effective throughput, reach and line stability. These techniques are gradually evolving from static or dynamic spectrum management techniques to multi-channel signal coordination.

By way of example, certain of the above-noted techniques allow active cancellation of inter-channel crosstalk through the use of a postcoder. In DSL systems, the use of a postcoder is contemplated to achieve crosstalk cancellation for upstream communications between customer premises equipment (CPE) or other types of network terminals (NTs) and a central office (CO) or another type of access node (AN). It is also possible to implement crosstalk control for downstream communications from the AN to the NTs, using so-called pre-compensation techniques implemented by a precoder.

Crosstalk estimates are commonly utilized in situations in which it is necessary to "join" an additional line to a group of active lines in a DSL system. For example, it may become necessary to activate one or more inactive lines in a synchronization group that already includes multiple active lines, where synchronization in this context refers to alignment in time of the DMT symbols for the different lines. Such joining of an additional line may require that the postcoder be adjusted accordingly in order to optimize system performance. Crosstalk estimates are also used in other situations, such as tracking changes in crosstalk over time. Thus, crosstalk estimation may be used to determine the residual crosstalk after postcoding and this information can be used to adjust the crosstalk coefficients.

Conventional crosstalk reduction techniques are deficient in terms of the information transfer rate required between a given receiver and a postcoder. For example, in certain DSL systems it is known to perform time-domain processing of the received signal, including determining the boundaries of the DMT symbols, followed by a transformation in the frequency domain to enable tone-based processing of the DMT symbols. Each tone that is part of the upstream band contains a received frequency-domain signal that can be represented by a complex value. The real and imaginary components of this value are typically presented by m bits each. In order to perform interference post-compensation, the receiver may supply the set of signals corresponding to the tones belonging to the upstream band to the postcoder using the m-bit representations of the complex values. More specifically, the signals corresponding to the upstream tones are sent by the receiver to the postcoder with m bits being used to represent each of the real and imaginary components of a given signal, such that 2m bits are required to represent each signal for each tone. Such an arrangement unduly increases the bandwidth requirements of the postcoder interface, and limits the throughput performance of the system. Also, the use of the m-bit representation can introduce quantization errors into the signals that are applied to the postcoder.

Accordingly, a need exists for improved post-compensation arrangements that can reduce the bandwidth requirements of the postcoder interface while also limiting the adverse impact of quantization error on received signals.

SUMMARY OF THE INVENTION

Illustrative embodiments of the invention provide a bandwidth-adaptive postcoder interface in which the required information transfer rate is given by a variable number of bits per tone that may be less than, equal to or greater than a specified bit loading $b_k$ per tone.

In accordance with one aspect of the invention, a postcoder is coupled between first and second portions of each of a plurality of receivers in a communication system. The postcoder is configured to receive an adaptive index representation of a scaled signal associated with the first portion of a first one of the receivers, and to process the adaptive index representation using an adjusted postcoder coefficient to generate a postcompensation signal. The scaled signal may be a scaled and rotated signal that is scaled and rotated by multiplying with a complex scaling factor. The postcompensation signal is supplied by the postcoder to the second portion of a second one of the receivers for use in postcompensation of at least one signal received by the second receiver. The postcoder and receivers may be implemented, for example, in an access node of the system.

In an illustrative embodiment, the adaptive index representation is mapped to a constellation point in the postcoder, and the constellation point is multiplied with the adjusted postcoder coefficient in the postcoder to generate the postcompensation signal.

Advantageously, the illustrative embodiments significantly reduce the required information transfer rate of the interface between at least one of the receivers and the postcoder, while also providing a capability to control the resolution of the signal representation per tone over time, and to provide a controlled trade-off between bandwidth and accuracy, thus largely avoiding the quantization error issues associated with the conventional m-bit representation approach. As a result, crosstalk control can be implemented in a more efficient, flexible and accurate manner, and system throughput performance is improved. For example, if insufficient bandwidth is available on a given interface, one can selectively reduce the precision for certain tones.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for post-compensation or other types of crosstalk control in such systems. The crosstalk control may be applied substantially continuously, or in conjunction with joining subscriber lines or other communication channels to a group of active channels in such systems, tracking changes in crosstalk over time, or in other line management applications. It should be understood, however, that the invention is not limited to use with the particular types of communication systems and crosstalk control applications disclosed. The invention can be implemented in a wide variety of other communication systems, and in numerous alternative crosstalk control applications. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context, as well as to systems utilizing higher order modulation in the time domain.

Figure 1:
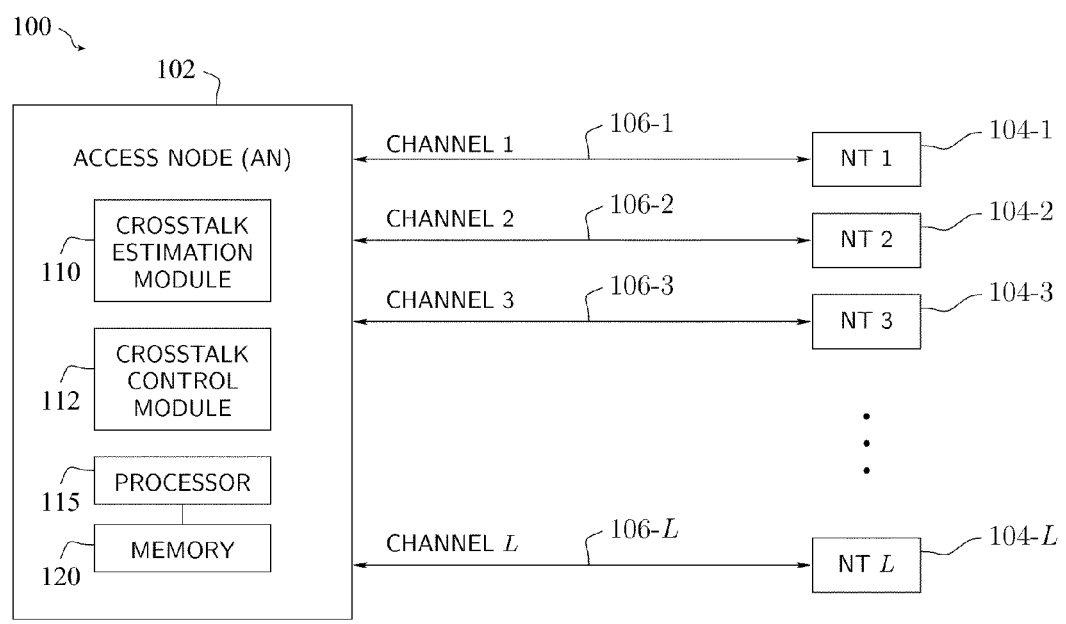
FIG. 1 is a block diagram of a multi-channel communication system in an illustrative embodiment of the invention.

FIG. 1 shows a communication system 100 comprising an access node (AN) 102 and network terminals (NTs) 104. The NTs 104 more particularly comprises L distinct NT elements that are individually denoted NT 1, NT 2, . . . NT L, and are further identified by respective reference numerals 104-1, 104-2, . . . 104-L as shown. A given NT element may comprise, by way of example, a modem, a computer, or other type of communication device, or combinations of such devices. The access node 102 communicates with these NT elements via respective channels 106-1, 106-2, . . . 106-L, also denoted Channel 1, Channel 2, . . . Channel L.

As indicated previously herein, in an embodiment in which system 100 is implemented as a DSL system, the AN 102 may comprise, for example, a central office (CO), and the NTs 104 may comprise, for example, respective customer premises equipment (CPE) elements. The channels 106 in such a DSL system comprise respective subscriber lines. Each such subscriber line may comprise, for example, a twisted-pair copper wire connection. The lines may be in the same binder or in adjacent binders, such that crosstalk can arise between the lines. Portions of the description below will assume that the system 100 is a DSL system, but it should be understood that this is by way of example only.

In an illustrative embodiment, fewer than all of the L lines 106-1 through 106-L are initially active lines, and at least one of the L lines is a "joining line" that is to be activated and joined to an existing group of active lines. The initially active lines are an example of what is referred to herein as a "group" of active lines. Such a group may be, for example, a synchronization group, which may also be referred to as a vectored group, or any other type of grouping of active lines.

Communications between the AN 102 and the NTs 104 include both downstream and upstream communications for each of the active lines. The downstream direction refers to the direction from AN to NT, and the upstream direction is the direction from NT to AN. Although not explicitly shown in FIG. 1, it is assumed without limitation that there is associated with each of the subscriber lines of system 100 an AN transmitter and an NT receiver for use in communicating in the downstream direction, and an NT transmitter and an AN receiver for use in communicating in the upstream direction. A given module combining an AN transmitter and an AN receiver, or an NT transmitter and an NT receiver, is generally referred to herein as a transceiver. The corresponding transceiver circuitry can be implemented in the AN and the NTs using well-known conventional techniques, and such techniques will not be described in detail herein.

The AN 102 in the present embodiment comprises a crosstalk estimation module 110 coupled to a crosstalk control module 112. The AN utilizes the crosstalk estimation module to obtain crosstalk estimates for respective ones of at least a subset of the lines 106. The crosstalk control module 112 is used to mitigate, suppress or otherwise control crosstalk between at least a subset of the lines 106 based on the crosstalk estimates. For example, the crosstalk control module may be utilized to provide post-compensation of upstream signals transmitted from the NTs to the AN. Such post-compensation is implemented using a postcoder, examples of which will be described in conjunction with FIGS. 2 and 3.

The crosstalk estimation module 110 may be configured to generate crosstalk estimates from pilots sent to the AN 102 from the NTs 104. The crosstalk estimates may be more generally referred to herein as crosstalk channel coefficients, crosstalk cancellation coefficients, or simply crosstalk coefficients. The NTs may send pilots during DMT sync symbols, which typically occur once every 257 symbols, but not all tones of such a sync symbol may use a pilot. The crosstalk estimation process may make use of interpolation techniques, examples of which are described in U.S. patent application Ser. No. 12/493,328, filed Jun. 29, 2009 and entitled "Crosstalk Estimation and Power Setting Based on Interpolation in a Multi-Channel Communication System," and U.S. patent application Ser. No. 11/934,347, filed Nov. 2, 2007 and entitled "Interpolation Method and Apparatus for Increasing Efficiency of Crosstalk Estimation," both of which are commonly assigned herewith and incorporated by reference herein.

The AN 102 further comprises a processor 115 coupled to a memory 120. The memory may be used to store one or more software programs that are executed by the processor to implement the functionality described herein. For example, functionality associated with crosstalk estimation module 110 and crosstalk control module 112 may be implemented at least in part in the form of such software programs running on processor 115. The memory 120 is an example of what is more generally referred to herein as a computer-readable storage medium that stores executable program code. Other examples of computer-readable storage media may include disks or other types of magnetic or optical media.

It is to be appreciated that the AN 102 as shown in FIG. 1 is just one illustration of an "access node" as that term is used herein. Such an access node may comprise, for example, a DSL access multiplexer (DSLAM). However, the term "access node" as used herein is intended to be broadly construed so as to encompass, for example, a particular element within a CO, such as a DSLAM, or the CO itself, as well as other types of access point elements in systems that do not include a CO. Other embodiments of the present invention need not be implemented in an access node, but more generally can be implemented in any communication system with more than one channel where the corresponding receivers are able to exchange information through a postcoder.

In the illustrative embodiment of FIG. 1 the lines 106 are all associated with the same AN 102. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

Each of the NTs 104 may be configurable into multiple modes of operation responsive to control signals supplied by the AN 102, as described in U.S. patent application Ser. No. 12/060,653, filed Apr. 1, 2008 and entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

Implementations of the system 100 of FIG. 1 that include a postcoder will be described below with reference to FIGS. 2 and 3. Such a postcoder is used for interference cancellation for upstream communications from the NTs 104 to the AN 102. However, it should be emphasized that similar techniques can be adapted for use in controlling crosstalk for downstream communications, as described in the above-cited U.S. patent application Ser. No. 12/640,975. Furthermore, the techniques disclosed herein are applicable to systems involving symmetric communications in which there is no particular defined downstream or upstream direction.

Figure 2:
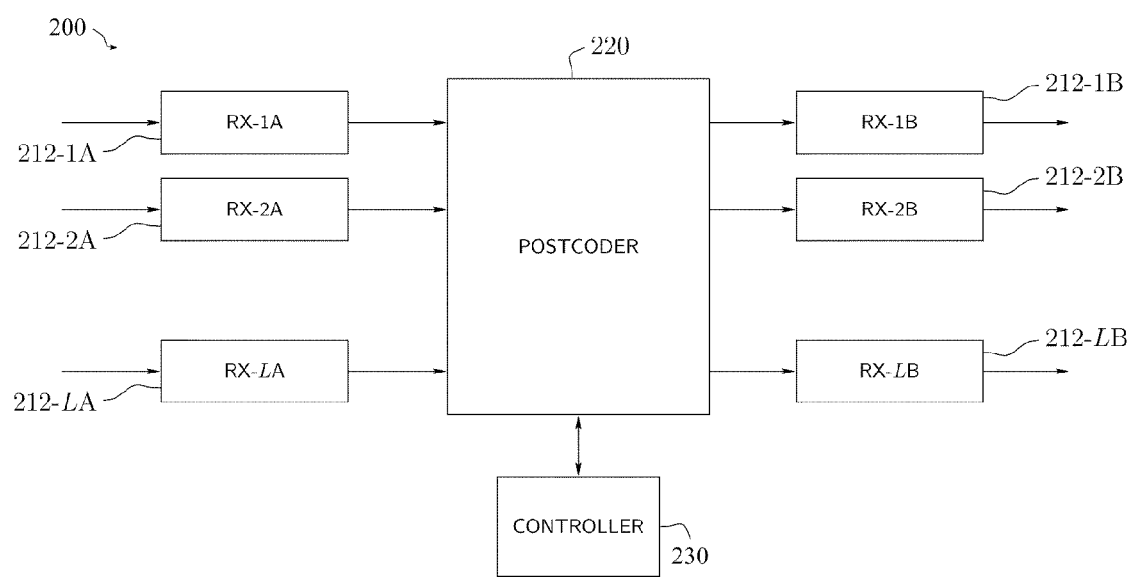
FIGS. 2 and 3 show portions of an access node of the FIG. 1 system as configured to implement a bandwidth-adaptive interface between a receiver and a postcoder in respective illustrative embodiments.

FIG. 2 shows a portion 200 of the AN 102 in which each of a plurality of receivers 212 is separated into first and second modules 212-$pA$ and 212-$pB$, p=1, 2, . . . L, with a postcoder 220 being coupled between the first and second modules of the receivers 212 as shown. This embodiment also includes a controller 230 coupled to the postcoder 220. In this embodiment, the first and second portions of each receiver are connected to one another through the postcoder 220. In other embodiments, such as the embodiment shown in FIG. 3, there is also a direct connection between the first and second portions of one or more of the receiver.

Generally, in illustrative embodiments of the invention, an access node comprises a postcoder coupled between first and second portions of each of a plurality of receivers. The first and second portions of each receiver may comprise entirely separate modules, such as the modules 212-$pA$ and 212-$pB$ in the FIG. 2 embodiment. It is also possible for the different portions to be contained within a single module, as will now be described with reference to the embodiment of FIG. 3.

Figure 3:
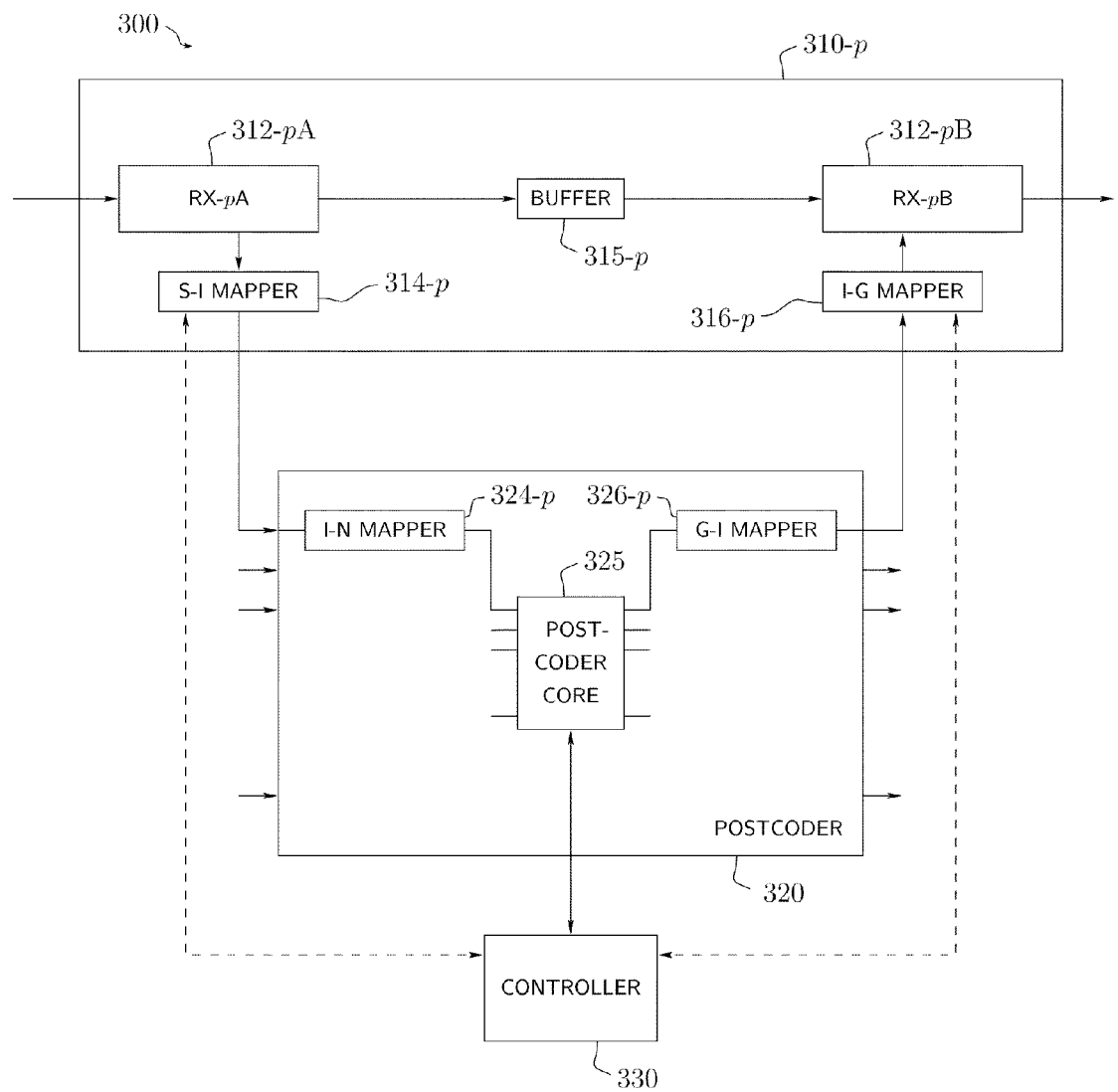

A portion 300 of the AN 102 as shown in FIG. 3 comprises a receiver 310-$p$, a postcoder 320 and a controller 330. The receiver 310-$p$ is one of a set of L receivers, p=1, 2, . . . L, of the AN 102, but only a single such receiver is shown in FIG. 3 for clarity and simplicity of illustration. The controller 330 is coupled to the postcoder 320 and the receivers 310 for controlling the reception of upstream signals in system 100. The receivers receive respective signals per DMT tone that are transmitted over upstream DMT sub-channels from respective NTs 104-1 through 104-L. The postcoder 320 utilizes crosstalk estimates to adjust the upstream signals in a manner that tends to cancel out the crosstalk introduced in traversing the upstream DMT sub-channels. Any of a wide variety of known postcoding techniques may be used to implement crosstalk cancellation for multiple joining and active lines of the type described herein. Such postcoding techniques are well understood by those skilled in the art and therefore will not be described in detail.

One example of a known postcoding technique that may be utilized in illustrative embodiments of the present invention is referred to as delayed post-compensation. This postcoding technique advantageously alleviates the adverse impact of a joining line on one or more active lines by allowing initial crosstalk coefficient estimates to be obtained and utilized in a particularly quick and efficient manner, and is also beneficial in other situations involving sudden line changes. See U.S. patent application Ser. No. 12/570,093, filed Sep. 30, 2009 and entitled "Crosstalk Control Using Delayed Post-Compensation in a Multi-Channel Communication System," which is commonly assigned herewith and incorporated by reference herein.

It should be noted that the portions of the receivers 310, postcoder 320 and controller 330 may be implemented in whole or in part using the processor 115 of FIG. 1. For example, portions of the functionality associated with these elements may be implemented in the form of software that is being executed in processor 115. The corresponding elements of the FIG. 2 embodiment may be implemented in a similar manner.

Illustrative embodiments of the invention will be described herein with reference to DMT tones. However, the term "tone" as used herein is intended to be broadly construed so as to encompass not only DMT tones but also other types of tones or carriers of other multi-carrier communication systems.

It is assumed for illustrative purposes only that upstream transmission over each of the L channels 106 in the system 100 is implemented using DMT modulation with M tones per channel. The nature of the channel from one transmitter to one receiver on a particular tone can be described under certain conditions (e.g., tone bandwidth not too wide) by a complex coefficient.

More specifically, the crosstalk from a disturber line into a victim line can be represented by a single complex vector which has as many components as there are DMT tones. For example, a given implementation of the system 100 may utilize 4096 DMT tones, in which case the complex vector would include 4096 components, one for each tone. Each component may be viewed as comprising a coefficient, also referred to herein as a crosstalk channel coefficient. It should be understood, however, that the set of DMT tones is typically separated into upstream and downstream tones, and some tones may not be subject to post-compensation. Thus, the dimensionality of the complex vector of crosstalk channel coefficients is typically smaller than the total number of tones.

In one possible joining arrangement involving the L lines 106 previously described in conjunction with FIG. 1, lines 1 through L−1 may collectively form a group of active lines and line L may be a new joining line. In such an arrangement, it is desirable to obtain estimates of the crosstalk channel coefficients between the joining line and each of the active lines so that the postcoder can utilize these estimates to significantly reduce interference between the joining line and the active lines. Again, it should be appreciated that the techniques disclosed herein are applicable to other crosstalk control contexts.

In one or more of the illustrative embodiments, it is assumed that the DSL system is generally configured in accordance with the VDSL2 standard, described in ITU-T Recommendation G.993.2, "Very high speed digital subscriber line transceivers 2," February 2006, which is incorporated by reference herein. It is further assumed that the DSL system supports cancellation of inter-channel crosstalk through the use of post-compensation, as described in ITU-T Draft Recommendation G.993.5, "Self-FEXT Cancellation (Vectoring) for use with VDSL2 transceivers," October 2009, which is incorporated by reference herein. The dominant inter-channel crosstalk in this context is more specifically referred to as far-end crosstalk (FEXT), which generally denotes crosstalk between signals traveling in the same direction, that is, between multiple downstream signals or between multiple upstream signals. A given DSL system may provide FEXT cancellation using an approach known as vectoring, where vectoring generally denotes a physical-medium-dependent (PMD) sub-layer coordination of line signals for either or both of transmission and reception.

Returning now to FIG. 3, the receiver 310-$p$ is more particularly illustrated as comprising at least a first portion 312-$p$A and a second portion 312-$p$B. Also included in the receiver 310-$p$ is a sample to index (S-I) mapper 314-$p$ and a buffer 315-$p$. The S-I mapper 314-$p$ operates in conjunction with an index to normalized sample (I-N) mapper 324-$p$ to provide a bandwidth-adaptive interface between the receiver 310-$p$ and the postcoder 320. The buffer 315-$p$ provides a direct path between the first portion 312-$p$A and the second portion 312-$p$B of the receiver 310-$p$. As indicated previously, only a particular one of the L receivers is shown in this figure, but it is to be understood that the remaining receivers of the AN 102 are configured in manner similar to that shown for receiver 310-$p$. Also, the postcoder 320 is assumed to include additional I-N mappers for interfacing with respective ones of these remaining receivers. Each of the I-N mappers drives a corresponding input of postcoder core 325.

Outputs of the postcoder core 325 are supplied to respective second portions of the receivers 310. More specifically, a given such output is supplied to the second portion 312-$p$B via a G-I mapper 326-$p$ implemented in the postcoder 320 and a corresponding I-G mapper 316-$p$ implemented in the receiver 310-$p$.

It should be noted that a given I-N mapper in the postcoder 320 may process the incoming reduced constellation indices originating from more than one receiver 310.

In one embodiment, the system can be configured to perform partial postcoding. For example, with reference again to FIG. 3, the effects of crosstalk from line p into line q can be postcompensated by connecting the output of module RX-pA to the postcoder 320 and connecting one output of the postcoder to module RX-qB. If the crosstalk from other lines into line p is not being postcompensated, it is not necessary to connect the output of the postcoder with the module RX-pB. Alternatively, if the crosstalk from line p into other lines is not being postcompensated, then it may not be necessary to connect RX-pA and the postcoder.

It should also be noted without loss of generality that different connection types and other interface configurations may co-exist in a given embodiment. For instance, the interfaces between one set of receivers and a postcoder which are co-located on a first circuit board may be different than the interfaces between another set of receivers on a different circuit board and the postcoder.

The controller 330 may comprise an otherwise conventional vectoring control entity (VCE) suitably modified to implement the techniques disclosed herein.

In the FIG. 3 embodiment, the crosstalk channel coefficients are estimated and adjusted by the controller 330 and supplied as effective postcoder coefficients to the postcoder 320. The postcoder core 325 compensates for the effects of crosstalk by processing the L received signals. As indicated above, each of the L receivers in this embodiment comprises a first portion 312-$p$A and a second portion 312-$p$B. The first portion 312-$p$A typically comprises an analog-to-digital converter (ADC) to digitize the received signal, synchronization modules to detect and extract the DMT symbols and a fast Fourier transform (FFT) module to determine the received signals per tone, all generally operating in a manner well understood by those skilled in the art. The second portion 312-$p$B typically comprises equalization modules, bit extraction modules, and frame reconstruction and error control modules, again all of which operate in a well-known manner.

The FFT module in the first portion 312-$p$A of receiver 310-$p$ converts the received signal from a time domain representation to a frequency domain representation. Let $s_k^{(p)}$ denote the received frequency-domain signal for line p and tone k. The output of the FFT module in the first portion 312-$p$A of receiver 310-$p$ provides the received signals $s_k^{(p)}$, where each of the received signals $s_k^{(p)}$ generally comprises a complex value. The resulting frequency domain representation is a signal vector $s^{(p)}$ that represents the signals in all of the upstream tones for line p.

As noted previously, in conventional practice the signals corresponding to the upstream tones are sent by the receiver to the postcoder with m bits being used to represent each of the real and imaginary components of a given signal, such that 2m bits are required for each signal at each upstream tone. This implies that for a given receiver with 1000 active upstream tones to be postcoded, the signal applied to an input data interface of the corresponding postcoder using conventional techniques would require approximately 4000×1000× 2×m bits, where 4000 is the number of DMT symbols per second. For m=14, such a signal would require an information transfer rate of 112 Mb/s, excluding any overhead. If one wanted to reduce this information transfer rate, one could reduce m, but would immediately lose resolution and thus the performance would be adversely affected.

Aspects of the present invention relate to representing the receiver signals in a particularly efficient manner that limits the required information transfer rate of the postcoder input data interface while preserving the necessary resolution. This is achieved in the present embodiment by configuring the receivers 310, postcoder 320 and controller 330 to utilize an alternative representation for the complex values of the receiver signals.

In the embodiment of FIG. 3, the bandwidth efficient interface between the first transmitter portion 312-$p$ and the postcoder 320 is provided using the S-I mapper 314-$p$ and the I-N mapper 324-$p$.

The S-I mapper 314-$p$ may be configured to determine the product of signal $s_k$ with a complex, adjustable scalar $\alpha_k$ and then to transform the complex signal $v_k = \alpha_k s_k$ into a constellation point to obtain an adaptive representation of $m_k$ bits. The scaling factor $\alpha_k$ may be determined in the first portion 312-$p$A of receiver 310-$p$ by processing the FFT output, and may additionally or alternatively be determined in the second portion 312-$p$B.

The I-N mapper 324-$p$ receives the $m_k$-bit representation from the S-I mapper 314-$p$ and transforms the corresponding point to a complex, non-scaled representation $\hat{v}_k$. The controller 330 determines the time instance when the scaling factor is updated and becomes effective, and it also computes effective postcoder coefficients $\alpha_{p,q}^{(k)}$ from respective crosstalk channel coefficients $h_{p,q}^{(k)}$ and the complex scalar $\alpha_k^{(q)}$, where $h_{p,q}^{(k)}$ denotes the crosstalk coefficient from line q into line p for tone k. In this way, the scalar multiplication in the S-I mapper 314-$p$ will be taken into account and the number of computations in the postcoder core 325 remains substantially unchanged.

The output of the postcoder core 325 is a scaled correction factor $c_k^{(p)}$ which may be further scaled and quantized in the G-I mapper 326-$p$. In the corresponding I-G mapper 316-$p$, the correction factor is rescaled and then added to the original signal $s_k$ which is supplied to the second portion 312-$p$ via buffer 315-$p$.

For a given line p, the postcoder 320 computes for every tone k, a post-compensated value $z_k$ given by $$z_k^{(p)} = h_{p,p}^{(k)} \cdot s_k^{(p)} + \eta_k^{(p)} \cdot c_k^{(p)}, \text{ where} \quad (1)$$

$$c_k^{(p)} = \sum_{q \neq p} a_{p,q}^{(k)} \cdot v_k^{(q)}, \quad (2)$$

$$v_k^{(p)} = \alpha_k^{(p)} \cdot s_k^{(p)}, \text{ and} \quad (3)$$

$$a_{p,q}^{(k)} = \frac{h_{p,q}^{(k)}}{\alpha_k^{(q)} \cdot \eta_k^{(p)}}. \quad (4)$$

The configuration of the S-I mapper 314-$p$ and the I-N mapper 324-$p$ will now be described in greater detail with reference to FIGS. 4 and 5, respectively.

Figure 4:
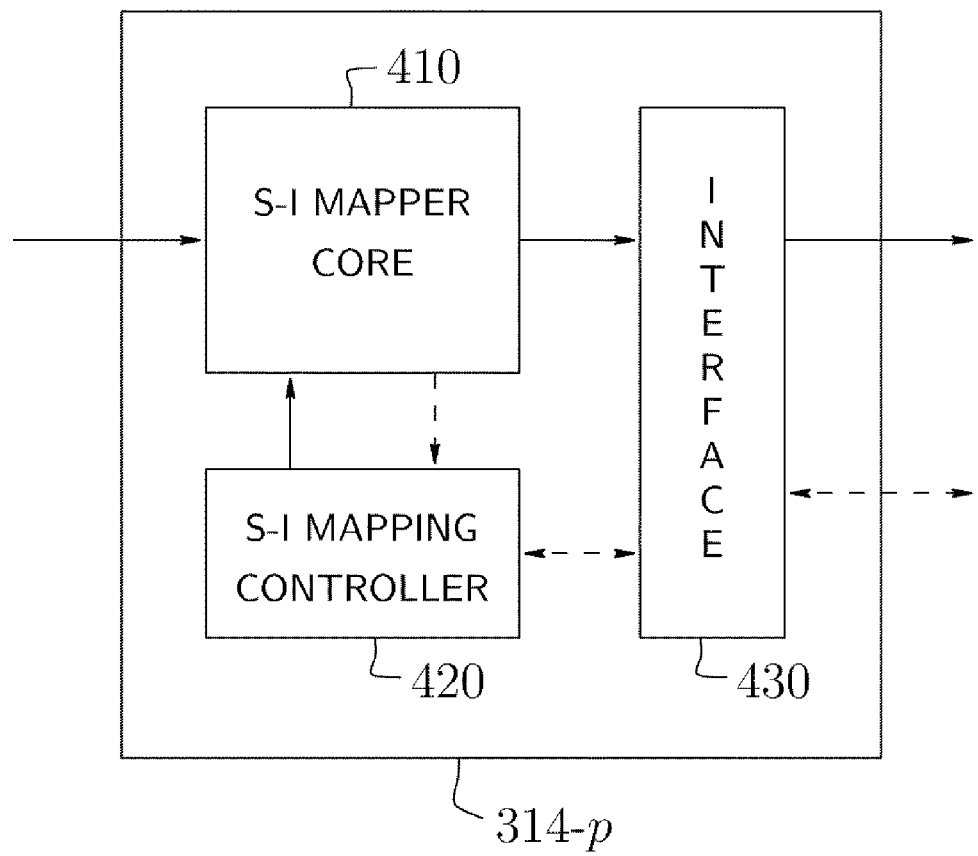
FIGS. 4 and 5 show more detailed views of respective mappers of the receiver and the postcoder in the FIG. 2 embodiment.
Figure 5:
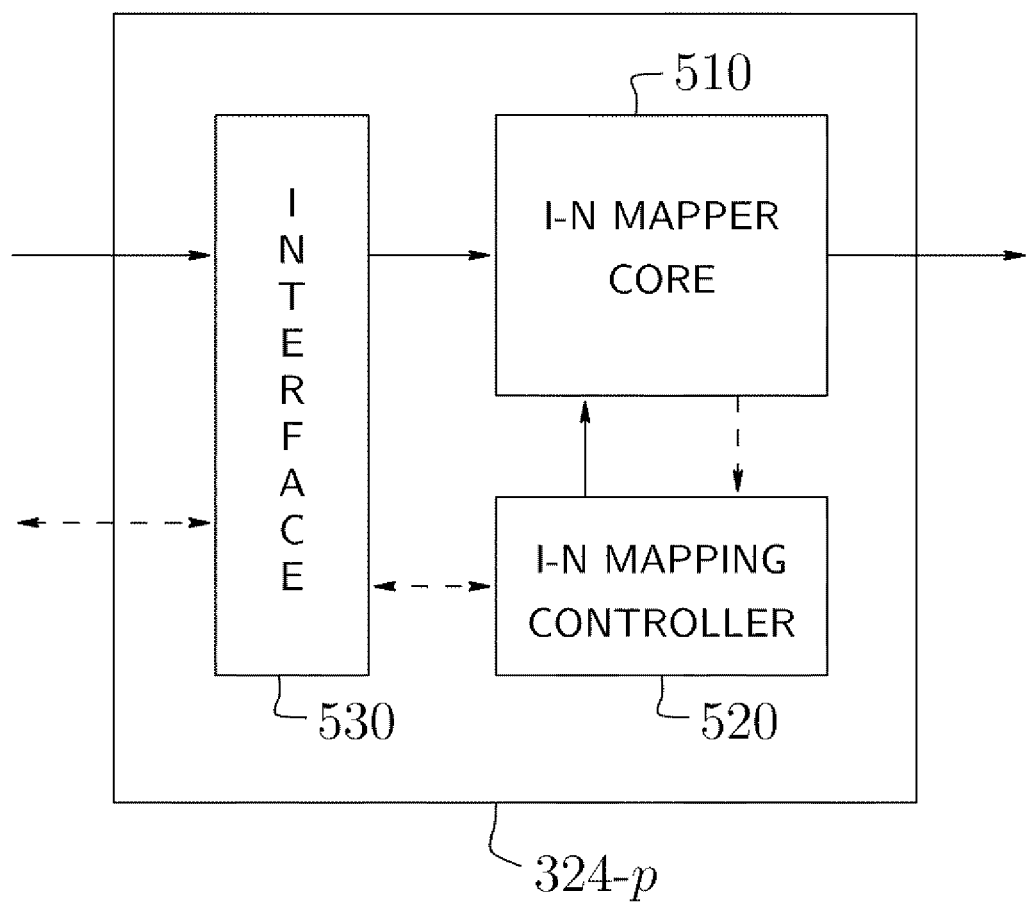

The S-I mapper 314-$p$ as shown in FIG. 4 comprises an S-I mapper core 410, an S-I mapper controller 420, and an interface 430. The S-I mapper controller 420 communicates with the controller 330 via the interface 430 as indicated by the dashed lines. Similarly, the I-N mapper 324-$p$ of FIG. 5 comprises an I-N mapper core 510, an I-N mapper controller 520, and an interface 530. The I-N mapper controller 520 communicates with the controller 330 via the interface 530 as indicated by the dashed lines.

The S-I mapper 314-$p$ in one implementation receives a sample or a vector of samples. The controller 420 provides information to the mapper core 410 about the expected constellation, generally indicated by $b_k$, for any tone k in the set of post-compensated upstream tones, and the required precision that is needed. The mapper core 410 performs a per-tone scaling operation, examples of which will be described below in conjunction with FIGS. 6, 7 and 8, and represents the value by at least one index. Multiple indices may be used in the case of hierarchical mapping, although such multiple indices could also be viewed as a single index with multiple components. Note that the mapper core may also operate on a group of tones and provide a vector index. The controller 420 also provides a complex scalar to the mapper core 410 to provide rotation and rescaling to an unscaled detection grid. The controller 420 or the mapper 410 may store these parameters in a local memory, or they may be obtained from another location, e.g., the second portion 312-$p$B of the receiver 310-$p$.

The interface 430 formats the variable length indices and controls the transmission of such indices to the postcoder 320. The mapper core 410 may also implement other operations, including an index-pruning operation. By way of example, such an operation may involve puncturing selected least significant positions of the index in accordance with the required resolution as specified by the controller 420.

Figure 6:
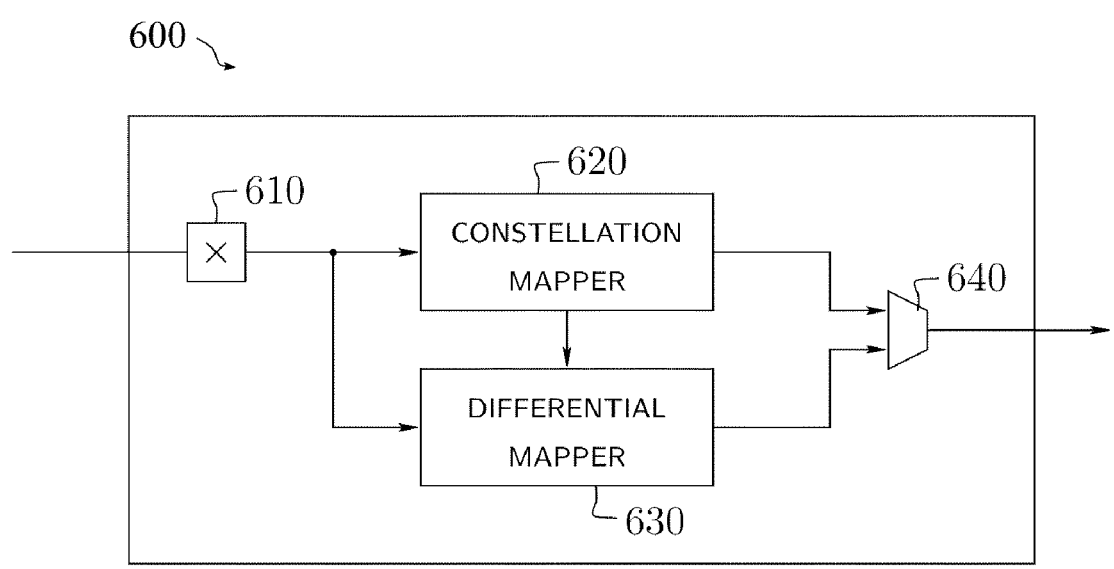
FIG. 6 is a block diagram of a superimposed mapper comprising a constellation mapper and a differential mapper.

As noted above, FIGS. 6, 7 and 8 show examples of possible implementations of the S-I mapper core 410 of FIG. 4. More specifically, FIG. 6 shows a superimposed mapper 600 comprising a multiplier 610, a constellation mapper 620, and a differential mapper 630. The operation of this particular arrangement will be described in greater detail below.

Figure 7:
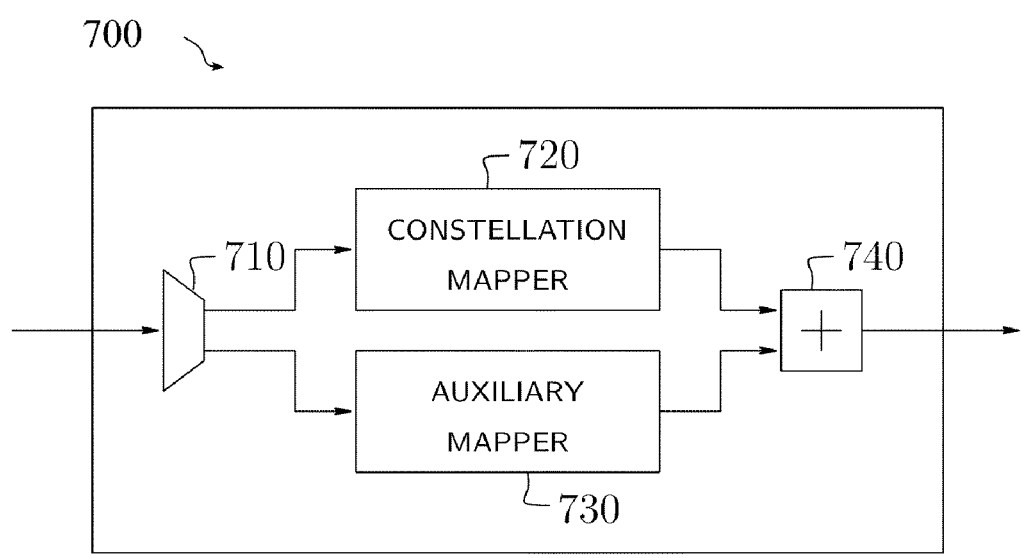
FIGS. 7 and 8 are block diagrams of superimposed mappers each comprising a constellation mapper and an auxiliary mapper.

FIG. 7 shows a mapper core 700 comprising a signal separator 710, a constellation mapper 720, an auxiliary mapper 730 and a signal combiner 740. The FIG. 7 arrangement can be used to map the received indices onto constellation points. It may receive information from an associated controller regarding how to parse the sequence of variable length indices. Relative scaling may be done in each of the mappers 720 and 730.

Figure 8:
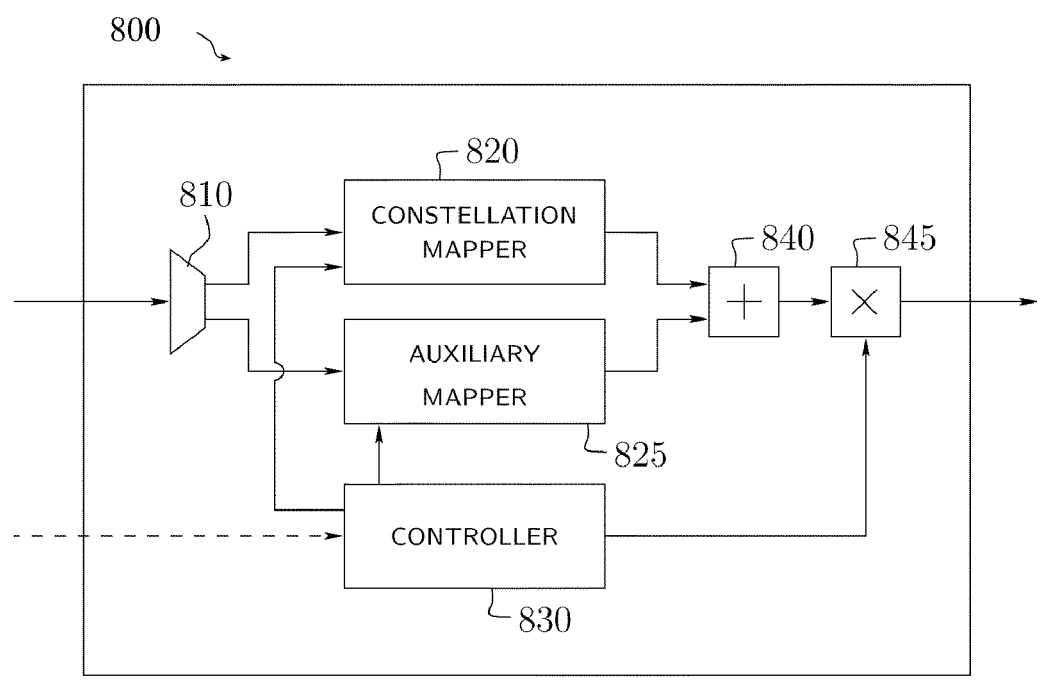

FIG. 8 shows a mapper core 800 comprising a signal separator 810, a constellation mapper 820, an auxiliary mapper 825, a controller 830, a signal combiner 840 and a multiplier 845. In addition to its use as an implementation of mapper core 410, this or a similar mapper core can also or alternatively be used, for example, within the G-I mapper 326-$p$ to process indices received from the postcoder core 325 prior to reconstructing the correction term that is then passed to the second portion 312-$p$B of the receiver 310-$p$. It includes a scaling operation implemented by the multiplier 845.

Referring again now to FIG. 5, the functionality of the I-N mapper 324-$p$ will generally depend on the functionality of the S-I mapper 314-$p$. The output of the I-N mapper core 510 is a plurality of integers that correspond to an unscaled constellation point. For post-compensation, the complex scaling factor is accounted for in the controller 330 by adjusting the effective postcoder coefficients that are used in the postcoder core 325.

The FIG. 3 embodiment generally provides an arrangement which includes scaling and rotation, followed by mapping. For an implementation using a 128-point quadrature amplitude modulation (QAM) constellation, a value of m=7 may be used, and the complex signal value $s_k$ is represented by 2m or 14 bits.

Other embodiments may implement variations on this approach, including the following:

1. Scaling and rotation, but no mapping. This means that a scaled and rotated version of $\text{Re}(v_k)$ and $\text{Im}(v_k)$ is forwarded to the postcoder 320 and no additional mapping is used. The core mappers in the mapper modules 314-$p$, 324-$p$, 326-$p$ and 316-$p$ are eliminated, just the multiplier with the adjustable scalar remains.

2. Scaling and rotation, followed by mapping at a lower resolution. For this variation, quantization is simpler and more accurate. For the previous example, it may be sufficient to use m=5, i.e., signal $s_k$ is represented by 10 bits.

Figure 9A:
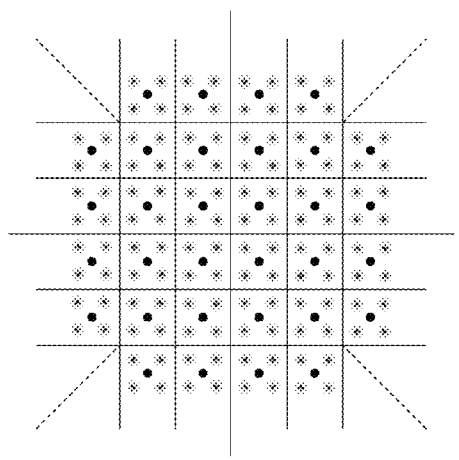
FIG. 9A illustrates the mapping of a received 128-QAM constellation into a 5-bit quantization detection grid.
Figure 9B:
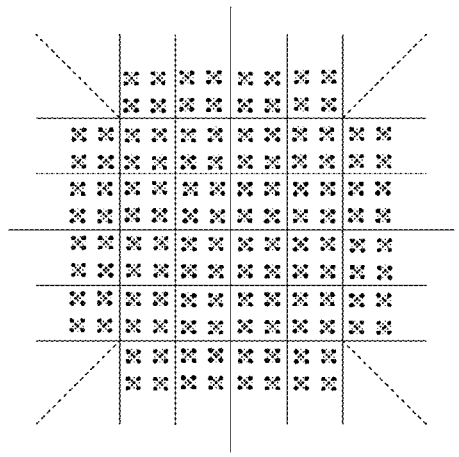
FIG. 9B illustrates the mapping of a received 128-QAM constellation into a 512-point hierarchical constellation.

3. Scaling and rotation, followed by mapping at a higher resolution using hierarchical constellations. For this variation, one could implement mapping to a lower order constellation in the S-I mapper 314-$p$. For given crosstalk coefficients, it is sufficient to perform a coarse quantization of $s_k$. In this case one could map the signal to a coarser constellation. This is illustrated in FIG. 9A. In this case, a 32-point constellation may be sufficient, which corresponds to 5 bits. Another variation in this category is to use a mapping to a higher order constellation in the S-I mapper 314-$p$ if more accuracy is needed. For example, in the case of the 128-point constellation, one could map onto a 512-point constellation, a 2048-point constellation, or an 8192-point constellation, which would require 9, 11, or 13 bits, respectively. An arrangement of this type for mapping onto a 512-point constellation is illustrated in FIG. 9B.

An alternative and more flexible approach to provide a higher resolution is to perform a two-stage quantization. The first quantization stage effectively performs hard decoding corresponding to the signal constellation parameter $b_k$ of signal $s_k$, i.e., a sequence $\hat{v}_k$ of length $b_k$ is formed. Then, in the second stage, the difference between $v_k$ and the hard-decoded constellation point $\hat{v}_k$ is quantized.

An exemplary arrangement of this type is illustrated in FIG. 6, which as noted above shows an implementation of the S-I mapper core 410 as superimposed mapper 600 comprising multiplier 610, constellation mapper 620 which may generate an output of $b_k$ bits, and differential mapper 630 which may generate an output of $m_k$ bits. The signal combiner 640 is operative to combine the output of $b_k$ bits from the constellation mapper with the output of $m_k$ bits from the differential mapper. The resulting constellation is referred to as a superimposed constellation, as it uses two different quantization schemes.

One possible quantization of the error signal $v_k - \hat{v}_k$ in the differential mapper 630 uses phase-shift keying with multiple rings and a total of $2m_k$ points.

Figure 9C:
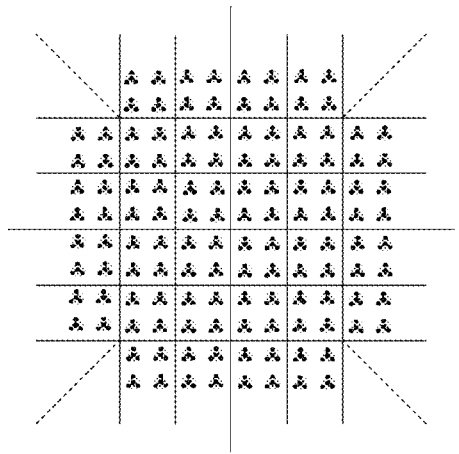
FIG. 9C illustrates the mapping of a received 128-QAM constellation into a 512-point superimposed constellation.

FIG. 9C shows an example of the resulting superimposed constellation with $m_k$=2 bits being used to quantize the error signal into one of four points, namely, a "null" point and points of a 3-PSK constellation. An advantage of this technique is that the additional resolution can be varied easily and that the quantization of the difference signal is more effective than for the hierarchical modulation.

For a superimposed constellation, the bit sequences that represent the detected tones have variable length, e.g., $b_k + m_k$. Such information can be communicated in variable length packets with delimiters and synchronization information. These packets can then be parsed using a tone ordering table with per-tone entries $b_k$ and $m_k$.

A form of frequency equalization may be used at initialization, and periodic tracking may be performed to control the angle and magnitude of $\alpha_k$.

By adding a point-dependent rotation angle to the superimposed PSK constellations, one could derive an additional parameter to monitor frequency equalization by determining the statistics of the error signal.

The controller 330 may be configured to use the crosstalk coefficients into the other lines to determine which resolution is needed for $s_k$. Several cost factors can be used to optimize the system for given performance and bandwidth requirements.

As a more particular example with reference to the superimposed mapper of FIG. 6, the controller 330 may be configured to control the resolution of $s_k$ by adjusting the parameter $m_k$ and redefining the meaning of the parameter $m_k$ for negative values. For $-b_k \leq m_k < 0$, the received signal will be mapped onto a reduced constellation corresponding to $b_k - |m_k|$ bits. For $m_k > 0$, mapping onto a hierarchical or superimposed constellation is used.

In the FIG. 3 embodiment, the postcoder 320 returns a correction signal to the second portion 312-$p$B of the receiver 310-$p$. As the controller 330 has knowledge of the parameters $b_k$, $g_k$, $tss_k$, $\alpha_k$ as well as $h_{p,q}^{(k)}$, for all lines, the controller can determine a scaling factor $\eta_k^{(p)}$ for line p and tone k. The parameters $b_k$, $g_k$, and $tss_k$ denote bit loading, gain adjuster, and frequency-domain transmit spectrum shaping coefficients, respectively. The scaling factor $\eta_k^{(p)}$ a positive real number which can be communicated to the second portion 312-$p$B and a similar scaling technique can be performed to combine the received signal and the correction value prior to further decoding. It is assumed that in most situations the first portion 312-$p$A and second portion 312-$p$B are co-located, for example, on the same line card, and that there are no bandwidth restrictions between the two modules. If they are not co-located, a quantization process with its own values of $b_k$ and $m_k$ can be used. In this case, $m_k \geq 0$.

The illustrative embodiments described above provide bandwidth-adaptive postcoder interfaces. This will enable interference compensation for a higher number of communication channels and the possibility to achieve crosstalk compensation for communication channels where the transceivers reside on multiple line cards.

Assuming that the standard conventional solution uses 2m bits to represent the real and imaginary components of the complex values of each tone, the embodiments described above use a variable number of bits to convey these values per tone. By rotating and scaling the received signals per tone, one can match the received signal with the detection grid. In addition, by analyzing the crosstalk coefficients, one can determine the necessary resolution. As such, the disclosed approach effectively controls the loss in accuracy in the communication link between the receivers and the interference cancellation postcoder(s). For situations where the crosstalk interference is small for certain tones, an additional reduction is possible with a negligible loss in accuracy.

It is to be appreciated that the particular constellations shown in FIG. 9 are just illustrative examples and that the disclosed techniques can be applied to other types of constellations and associated mappings.

It should also be noted that the illustrative techniques described above can be adapted for use in other contexts, including scaling at the output of the postcoder, and downstream pre-compensation. Examples of implementations of the latter type are disclosed in the above-cited U.S. patent application Ser. No. 12/640,975.

Alternative embodiments of the invention can be implemented using other arrangements of access node elements. For example, in one such embodiment, it is possible to configure the receiver portions 312-$p$A such that each maps a received signal into complex values but does not scale the complex values. The scaled crosstalk coefficients are generated in the controller 330 in the manner previously described, and applied to the complex values in the postcoder.

Embodiments of the present invention may be implemented at least in part in the form of one or more software programs that are stored in a memory or other processor-readable medium of AN 102 or NTs 104 of system 100. Such programs may be retrieved and executed by a processor in the AN or NTs. Of course, numerous alternative arrangements of hardware, software or firmware in any combination may be utilized in implementing these and other systems elements in accordance with the invention. For example, embodiments of the present invention may be implemented in a DSL chip or other similar integrated circuit device. As another example, embodiments of the invention may be implemented using multiple line cards of an access node, with the improved postcoder interfaces being utilized to facilitate the transfer of information across the line cards.

Examples of access nodes having multiple line card arrangements that can be adapted for use in implementing embodiments of the present invention are disclosed in the above-cited European Patent Application No. 09290482.0, filed Jun. 24, 2009 and entitled "Joint Signal Processing Across a Plurality of Line Termination Cards.".

It should again be emphasized that the embodiments described above are presented by way of illustrative example only. Other embodiments may use different communication system configurations, AN and NT configurations, communication channels, crosstalk estimate generation and crosstalk control process steps, depending on the needs of the particular communication application. Alternative embodiments may therefore utilize the techniques described herein in other contexts in which it is desirable to control crosstalk between multiple channels of a communication system.

In the illustrative embodiment of FIG. 2, it is assumed that all of the lines are subject to post-compensation. Also, there is no separate connection between the first and second portions of the receivers other than through the postcoder. However, other embodiments need not be so configured, and one or more lines may not have associated post-compensation. In an arrangement of this type, the disclosed techniques may be used to measure how much crosstalk would be caused in non-post-compensated active lines, and a determination may then be made to reduce the power level on certain tones that are giving rise to this interference.

It should also be noted that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method comprising:
receiving in a postcoder coupled between first and second portions of each of a plurality of receivers of a communication system an adaptive index representation of a scaled signal associated with the first portion of a first one of the receivers;
processing the adaptive index representation in the postcoder using an adjusted postcoder coefficient to generate a postcompensation signal;
wherein the postcompensation signal is supplied from the postcoder to the second portion of a second one of the receivers for use in postcompensation of at least one signal received by the second receiver.

2. The method of claim 1 wherein the step of processing the adaptive index representation in the postcoder further comprises the steps of:
mapping the adaptive index representation to a constellation point in the postcoder; and
multiplying the constellation point with the adjusted postcoder coefficient in the postcoder to generate the postcompensation signal.

3. The method of claim 1 further including the step of generating the adjusted postcoder coefficient in a controller of an access node of the system.

4. The method of claim 3 further including the step of supplying the adjusted postcoder coefficient to the postcoder from a vectoring control entity of the controller.

5. The method of claim 1 further including the step of generating the adjusted postcoder coefficient as a function of a corresponding crosstalk coefficient and a complex scaling factor utilized to generate the scaled signal.

6. The method of claim 5 wherein the step of generating the adjusted postcoder coefficient further comprises generating a scaled crosstalk coefficient $a_{p,q}^{(k)}$ from a crosstalk coefficient $h_{p,q}^{(k)}$ and a complex scalar $\alpha_k^{(q)}$, where p and k denote line and tone, respectively, of a received signal comprising said signal, and where $h_{p,q}^{(k)}$ denotes the crosstalk coefficient from line q into line p for tone k.

7. The method of claim 6 wherein the postcoder generates the postcompensation signal as a scaled correction factor $c_k^{(p)}$ which is given by:

$$c_k^{(p)} = \sum_{q \neq p} a_{p,q}^{(k)} \cdot v_k^{(q)}, \text{ where } v_k^{(p)} = \alpha_k^{(p)} \cdot s_k^{(p)}$$

and $s_k^{(p)}$ denotes a received signal for line p and tone k.

8. The method of claim 7 further comprising the step of transforming the scaled correction factor into a constellation point in an output mapper of the postcoder.

9. The method of claim 1 wherein the receiving step further comprises receiving said adaptive index representation of the scaled signal from a sample to index mapper of the first receiver.

10. The method of claim 9 wherein the step of processing the adaptive index representation in the postcoder further comprises mapping the adaptive index representation to a constellation point in an index to numeric mapper having an input coupled to an output of the sample to index mapper of the first receiver.

11. A non-transitory computer-readable storage medium having embodied therein executable program code that when executed by a processor of an access node of the system causes the access node to perform the steps of the method of claim 1.

12. An apparatus comprising:
a postcoder configured for coupling between first and second portions of each of a plurality of receivers in a communication system, the postcoder being configured to receive an adaptive index representation of a scaled signal associated with the first portion of a first one of the receivers, and to process the adaptive index representation using an adjusted postcoder coefficient to generate a postcompensation signal that is supplied by the postcoder to the second portion of a second one of the receivers for use in postcompensation of at least one signal received by the second receiver.

13. The apparatus of claim 12 wherein the postcoder comprises an index to numeric mapper configured to receive the adaptive index representation of the scaled signal from a corresponding sample to index mapper of the receiver and to map the adaptive index representation to a first constellation point.

14. The apparatus of claim 13 wherein the postcoder further comprises an output mapper configured to transform the postcompensation signal into a second constellation point.

15. An apparatus comprising:
a plurality of receivers; and
a postcoder coupled between first and second portions of each of the plurality of receivers;

wherein the postcoder is configured to receive an adaptive index representation of a scaled signal associated with the first portion of a first one of the receivers, and to process the adaptive index representation using an adjusted postcoder coefficient to generate a postcompensation signal that is supplied by the postcoder to the second portion of a second one of the receivers for use in postcompensation of at least one signal received by the second receiver.

16. The apparatus of claim 15 wherein the first receiver comprises a sample to index mapper configured to receive said scaled signal from the first portion of the first receiver and to generate said adaptive index representation of the scaled signal for delivery to the postcoder.

17. The apparatus of claim 15 wherein the postcoder comprises an index to numeric mapper configured to receive the adaptive index representation of the scaled signal from the sample to index mapper of the first receiver and to map the adaptive index representation to a constellation point.

18. The apparatus of claim 15 wherein the adaptive index representation comprises $b_k + m_k$ bits per tone, where $b_k$ denotes a specified bit loading for a given tone and $m_k$ denotes a constellation adjustment factor.

19. The apparatus of claim 18 wherein the constellation adjustment factor is negative such that a constellation used to generate the adaptive index representation has a lower resolution than a transmission constellation associated with said scaled signal.

20. The apparatus of claim 18 wherein the constellation adjustment factor is positive such that a constellation used to generate the adaptive index representation has a higher resolution than a transmission constellation associated with said scaled signal.

21. The apparatus of claim 16 wherein the sample to index mapper comprises a superimposed mapper comprising a constellation mapper for mapping the scaled signal into a first representation having a first number of bits and a differential mapper for mapping an error signal based on the first representation into a second representation having a second number of bits.

* * * * *